United States Patent [19]

Takada et al.

[11] Patent Number: 5,589,130

[45] Date of Patent: Dec. 31, 1996

[54] METHOD OF INJECTION MOLDING A PREFORM AND APPARATUS FOR THE SAME

[75] Inventors: Minoru Takada; Koichi Sato; Kazuyuki Yokobayashi, all of Ueda, Japan

[73] Assignee: Nissei ASB Machine Co., Ltd., Komori, Japan

[21] Appl. No.: 403,742

[22] PCT Filed: Jul. 29, 1994

[86] PCT No.: PCT/JP94/01247

§ 371 Date: Mar. 13, 1995

§ 102(e) Date: Mar. 13, 1995

[87] PCT Pub. No.: WO95/03930

PCT Pub. Date: Feb. 9, 1995

[30] Foreign Application Priority Data

Jul. 30, 1993 [JP] Japan .................... 5-208547

[51] Int. Cl.[6] .................... B29C 49/06; B29C 49/64
[52] U.S. Cl. .................... 264/537; 264/328.16; 264/334; 425/533; 425/534; 425/548; 425/552; 425/577; 425/556
[58] Field of Search .................... 264/327, 297.2, 264/297.3, 297.6, 513, 537, 538, 328.11, 328.8, 328.14, 328.16, 334; 425/533, 537, 526, 540, 541, 548, 552, 556, 574, 575, 576, 577, 588, 534

[56] References Cited

U.S. PATENT DOCUMENTS

| | | |
|---|---|---|
| 3,337,667 | 8/1967 | Ninneman ........................ 264/538 |
| 3,707,591 | 12/1972 | Chalfant . |
| 3,740,180 | 6/1973 | Sidur . |
| 3,816,580 | 6/1974 | Valyi ........................ 264/327 |
| 3,887,316 | 6/1975 | Hestehave . |

(List continued on next page.)

FOREIGN PATENT DOCUMENTS

| | | |
|---|---|---|
| 162424 | 11/1985 | European Pat. Off. . |
| 228324 | 7/1987 | European Pat. Off. . |
| 1395787 | 12/1965 | France . |
| 57-93126 | 6/1982 | Japan . |
| 57-105321 | 6/1982 | Japan . |
| 3-140219 | 6/1991 | Japan . |
| B2-4-15721 | 3/1992 | Japan . |

OTHER PUBLICATIONS

Patent Abstracts of Japan, vol. 16, No. 270 (M–1266), Jun. 17, 1992, JP–A–4065215.
Patent Abstracts of Japan, vol. 6, No. 153 (M–149), Aug. 13, 1992, JP–57070620.

*Primary Examiner*—Jill L. Heitbrink
*Attorney, Agent, or Firm*—Oliff & Berridge

[57] ABSTRACT

An injection molding apparatus for a preform is disclosed, having an injection molding station (14) and a cooling and ejection station (16). In the injection molding station (14), neck cavity molds (60), injection core molds (50) and an injection cavity mold (42) are clamped and preforms (1) are injection molded. Thereafter, the injection cavity mold (42) is separated at a relatively high temperature. The preforms (1) are transferred to the cooling and ejection station (16) while being cooled by the injection core molds (50) and neck cavity molds (60). While the next preforms (1) are being injection molded in the injection molding station (14), in the cooling and ejection station (16) cooling of the preforms (1) continues. After cooling the preforms (1) to a temperature suitable for release, the injection core molds (50) are separated only through a stroke sufficient to allow a space to open between core pins (52) of the injection core molds 50 and the inner surface of the preforms (1). Thereafter the neck cavity molds (60) are separated and the preforms (1) are ejected. When the injection molding of the next preforms (1) in the injection molding station (14) is completed, a rotary wheel (30) is driven rotatingly in the opposite direction to the previous operation, and the injection core molds (50) and neck cavity molds (60) are interchanged between the two stations (14 and 16).

22 Claims, 7 Drawing Sheets

U.S. PATENT DOCUMENTS

| | | | |
|---|---|---|---|
| 3,966,378 | 6/1976 | Valyi | 264/538 |
| 3,990,826 | 11/1976 | Marcus . | |
| 4,107,362 | 8/1978 | Valyi | 264/538 |
| 4,201,535 | 5/1980 | Ninneman . | |
| 4,472,131 | 9/1984 | Ryder | 264/328.16 |
| 4,615,667 | 10/1986 | Roy | 264/538 |
| 4,836,767 | 6/1989 | Schad et al. | 264/297.3 |
| 4,846,661 | 7/1989 | Nakamura et al. | 264/538 |
| 5,080,574 | 1/1992 | Koga et al. | 264/538 |
| 5,403,177 | 4/1995 | Priest | 264/538 |
| 5,501,593 | 3/1996 | Marcus | 264/328.16 |

METHOD OF INJECTION MOLDING A PREFORM AND APPARATUS FOR THE SAME

FIELD OF THE INVENTION

The present invention relates to a method of injection molding a preform, and apparatus for the same, which ensures an adequate cooling time, but allows a reduction in the injection molding cycle time.

BACKGROUND OF THE INVENTION

To injection-mold a preform requires at least an injection cavity mold defining the outer surface of the preform, and an injection core mold defining the inner surface of the preform. Furthermore, after clamping the injection cavity mold and injection core mold together and injection molding the preform, it is necessary to maintain the molds in the clamped state until the preform is cooled to a temperature at which the preform can be released from the molds.

Conventionally, therefore, to ensure that the preform temperature is sufficiently low for releasing has required the injection molding cycle time to be increased, and thus the productive efficiency to be impaired. The following are four factors concerned with longer cooling times.

(1) If for example the preform is released from the injection cavity mold and injection core mold and ejected by dropping, the preform must be cooled so that the temperature when the mold is separated is sufficiently low that the preform is not deformed by contact with other objects.

(2) If the temperature when the preform is released from the mold is high, then when removing the injection core mold from the preform, deformation problems caused by the preform sticking to the core mold may occur.

(3) If the temperature when the preform is released from the mold is high, since there is no longer any member restraining the deformation of the preform after the preform has been released from the injection core mold, deformation problems due to thermal unevenness or thermal shrinking may occur and prevent the preform from meeting its design requirements.

(4) If the cooling by the injection core mold is inadequate, the inner periphery of the preform in particular may suffer crystallization as a result of the inadequate cooling, and a preform with a non-transparent body may be obtained.

In response to this, Japanese Patent Publication No. Hei 4-15721 (1992) and Japanese Patent Application Laid-Open No. Hei 3-140219 (1991) disclose a rotary injection molding apparatus having an injection molding station, a cooling station and an ejection station disposed in this order at halting positions of an intermittent rotary transport means, in which a preform molded at the injection molding station is transported supported by a neck mold of the intermittent transport means successively to the cooling station and ejection station.

In such a rotary injection molding apparatus, it is not necessary to consider factor (1) above, but inevitably factors (2) to (4) still cause the injection molding cycle time to increase.

Further, in the case of such a rotary injection molding apparatus, the cooling station requires a cooling pot and a cooling core, and since it is further necessary to provide a separate ejection station, the number of stations increases, and more neck molds are required. Thus such an injection molding apparatus leads to increased size and complexity of the apparatus, and a larger number of components.

Using such a rotary injection molding apparatus, to prevent crystallization of the thickest portion of the preform, that is to say, the neck, it is also possible to cool the neck with the neck mold. However, since the rotation is one-directional, to provide a cooling medium to the neck mold involves the use of a rotary coupling, which complicates the mechanism further.

Moreover, without extracting the injection core mold completely from the preform, it is not possible to eject the preform in a conventional injection molding apparatus, and a rotary injection molding apparatus it is not possible to transport the preform from the injection molding station to the next stage. To extract the injection core mold completely from the preform in this way involves a long extraction movement, and this leads to the problem of a high overall height for the apparatus.

If, however, the preform is ejected before complete cooling in the injection core mold and injection cavity mold (with the preform maintained at a temperature to allow processing at the next stage), and passes to a next stage where it is subjected to secondary processing such as blow-molding, the following problems may occur.

(A) Unless the internal pressure (pressure maintained for injection) is sufficient, concavities are formed on the injection cavity mold side of the preform, and a preform with a uniform temperature distribution is not obtained. Therefore, when this preform is blow-molded, a product of uniform thickness may not be obtained.

(B) If the internal pressure (pressure maintained for injection) is excessively increased, a pressure difference arises between a gate portion and the end of the preform (for example the neck portion), and a residual stress becomes large in the high pressure preform bottom portion. As a result, the blow-molding process does not yield a product with an even thickness distribution.

(C) When the preform is cooled through the injection core and the injection cavity, as the cooling proceeds the preform shrinks, and comes away from the injection cavity. The outer surface of the preform, therefore, has some portions in contact with the injection cavity and some not, as a result of which there are variations in the cooling rate, and the temperature is not uniform. Therefore, when this preform is blow-molded, a product of uniform thickness is not obtained.

In the light of this, the present invention has as its object the provision of a method of injection molding a preform, and apparatus for the same, which ensures an adequate cooling time, but allows a reduction in the injection molding cycle time and an improvement in productive efficiency.

Another object of the present invention is the provision of a method of injection molding a preform, and apparatus for the same in which even if the preform is released from the mold at a high temperature, there is no temperature variation, or deformation of the preform resulting from sticking of the preform to the injection core mold.

A further object of the present invention is the provision of a method of injection molding a preform, and apparatus for the same in which while the injection cycle time is reduced, white crystallization caused by insufficient cooling is avoided.

A further object of the present invention is the provision of a method of injection molding a preform, and apparatus for the same in which without unduly increasing the injection maintenance pressure while injection molding the preform, a preform with low residual stress is obtained, and even if concavities occur, the preform can be ejected with reduced non-uniformities in temperature by reducing the dependence on the injection cavity mold for cooling.

SUMMARY OF THE INVENTION

The method of the present invention comprises:

a step in an injection molding station of injection molding a preform in clamped molds including an injection cavity mold and injection core mold each of which has a cooling portion;

a step in said injection molding station of releasing said preform from said injection cavity mold;

a step of transferring said preform while being cooled by said injection core mold to a cooling and ejection station; and a step in said cooling and ejection station of cooling said preform by said injection core mold until injection molding of a next preform in said injection molding station is completed, and thereafter ejecting said preform from said injection core mold.

According to the method of the present invention, a preform injection-molded in the injection molding station is cooled by the injection cavity mold and injection core mold, and thereafter the preform is released only from the injection cavity mold. Thereafter the preform is transferred by means of the injection core mold to the cooling and ejection station. Both during the transfer and in the cooling and ejection station, the preform is cooled by the injection core mold, and thereafter the preform is ejected.

As a result, even after the injection cavity mold has been separated from the preform in the injection molding station, since it is cooled by the injection core mold, an adequate cooling time for the preform can be assured. This allows the injection cavity mold to be separated in the injection molding station at a higher temperature, and shortens the injection molding cycle time. Moreover, when with this higher temperature the injection cavity mold is separated, the injection core mold prevents deformation of the preform, and moreover crystallization and non-transparency of the body of the preform caused by inadequate cooling can be prevented.

In said injection molding step, said preform, which has a neck portion having an undercut with respect to the direction of mold-opening, can be injection molded using a neck cavity mold defining the outer surface of said neck portion. This neck cavity mold comprises a split pair of molds having cooling portions.

When a neck cavity mold is used, in said transfer step and said cooling step in said cooling and ejection station, said preform is cooled with said injection core mold and said neck cavity mold maintained in the clamped state. Moreover, in said ejection step in said cooling and ejection station, said injection core mold is separated from said neck cavity mold by relative driving through only a stroke sufficient to allow a space to open between said injection core mold and the inner surface of said preform held by said neck cavity mold. Thereafter said split pair of molds of said neck cavity mold is driven to be separated, and said preform is ejected.

In this case, even after separation of the injection core mold, the neck portion of the preform continues to be cooled by the neck cavity mold, the thick neck portion can be adequately cooled, and white crystallization thereof is prevented. Moreover, since there is no necessity to withdraw the injection core mold from the entire length of the preform, the mold-opening stroke of the injection core mold can be reduced.

Moreover, since even after separation of the injection core mold, the injection core mold remains within the preform, even if the preform should adhere to either of the split pair of molds constituting the neck cavity mold, movement of the preform in the direction of driving said pair of split molds to be separated is restricted by the injection core mold.

The cooling time of said preform can be adjusted by adjusting the timing of said mold-opening driving in said cooling and ejection station. As a result, without necessarily changing the injection molding cycle time, the optimum cooling time for the preform can be ensured. Moreover, by adjusting the timing of separating the injection core mold, the increase in release pressure with the progress of cooling of the preform can be met, and an injection molding apparatus of general applicability can be provided.

It is preferable that said injection core mold and said neck cavity mold together are reversibly rotated between said injection molding station and said cooling and ejection station, which being separated by substantially 180 degrees, and said injection core mold and said neck cavity mold are transferred so as to be interchanged between said stations.

Reversing the direction of interchange of the injection core mold and neck cavity mold between the stations once per cycle simplifies the connections of pipes circulating cooling medium to the injection core mold and neck cavity mold.

In said transfer step and during cooling in said cooling and ejection station, said neck cavity mold is held in contact with said injection core mold by a return spring, maintaining the clamped state of both said molds, as a result of which the clamped state of the molds can be maintained without requiring a power source, and the cooling of the preform can be promoted.

In this case, in said cooling and ejection station, said neck cavity mold holding said preform is pulled away from said injection core mold by an external force opposing the urging force of said return spring, so that said injection core mold is separated from said preform.

It is preferable that the step of separating said injection cavity mold is carried out after the formation of a skin layer on the outer surface of said preform cooled by said injection cavity mold sufficient to maintain the shape of said preform after separation from said injection cavity mold. This prevents deformation of the preform after separation of the injection cavity mold, while enabling the minimum injection molding cycle time to be attained.

If the neck portion has no undercut, and it is not necessary to use a neck cavity mold, in said cooling and ejection station, said preform may be ejected by blowing air from said injection core mold within said preform.

The method of blow molding of the present invention comprises:

a step of transferring a preform injection-molded as described above to a blow-molding station while the heat of injection molding is retained; and a step of blow-molding a hollow body from said preform, by disposing said preform in a blow cavity mold, applying longitudinal stretching by means of a stretching rod, and introducing air from a blow core mold in said blow-molding station.

In the case where the preform is to be released from the injection mold before cooling is complete, and subjected to secondary processing such as blow-molding, since the preform is released from the injection cavity mold earlier, uniform cooling of the inner surface of the preform by the injection core mold is obtained from the increased contact pressure due to shrinkage of the preform, and therefore the quality of the product can be significantly improved, and particularly the desired thickness distribution of the product resulting from the secondary processing such as blow-molding, can be obtained.

The injection molding apparatus for a preform of the present invention has an injection molding station for injection molding a preform, and a cooling and ejection station for releasing and ejecting said preform after cooling, and comprising:

- injection core molds disposed at positions corresponding to both of said stations and having a function of cooling said preform;
- an interchange transfer means for interchanging said injection core molds between said both stations;
- an injection cavity mold adapted to be clamped with said injection core mold disposed in said injection molding station, and having a function of cooling said preform;
- a mold clamping means operating to clamp said injection core mold and injection cavity mold in said injection molding station, and also operating to separate relatively said injection cavity mold from said preform; and
- an ejection means, operating to eject said preform from said injection core mold after said preform disposed in said cooling and ejection station has been cooled by said injection core mold.

By means of such an apparatus, the above-described method of the present invention can be practiced, and while reducing the injection molding cycle time, adequate cooling time for the preform can be assured.

It is preferable that said interchange transfer means comprises a rotary wheel executing intermittent rotary transfer of said injection core mold between said injection molding station and cooling and ejection station, which being disposed at rotary positions separated by substantially 180 degrees.

In the apparatus of the present invention, a neck cavity mold can be used. In this case, the neck cavity mold adapted to be clamped and opened relatively with said injection core mold is supported by said rotary wheel. This neck cavity mold comprises a split pair of molds defining the outer surface of a neck portion of said preform, and said split pair of molds each have cooling portions.

In this case, said rotary wheel transfers said preform having been injection molded to said cooling and ejection station while said preform is being cooled by said neck cavity mold and said injection core mold.

When using a neck cavity mold as described above, said ejection means comprises:

- a mold opening means which operates to separate said neck cavity mold relative to said injection core mold through only a stroke sufficient to allow a space to open between said injection core mold and the inner surface of said preform held by said neck cavity mold; and
- a split mold opening means which after said neck cavity mold has been subject to said relative mold opening operates to separate said split pair of molds and eject said preform.

In order to maintain the injection core mold and neck cavity mold in the clamped state during transfer, a return spring is further provided, which urges said neck cavity mold against said injection core mold and maintains both molds in the clamped state. Here, said mold opening means opposes the urging force of said return spring and operates to separate said neck cavity mold relative to said injection core mold.

As a construction for supporting the neck cavity mold may be provided:

- two split plates supporting respective of said split pair of molds constituting said neck cavity mold;
- a guide member guidably supporting said two split plates so as to be selectively contacted or separated, and to which said return spring is attached;
- a pressure plate disposed above said two split plates; and
- a driven shaft erected in the upward direction above said pressure plate and of such a length that the upper end does not reach said rotary wheel.

In this case, said mold opening means comprises:

- a through hole provided in said rotary wheel in a position corresponding to said driven shaft;
- a drive shaft having a lower end above said through hole; and
- a first drive means pressingly driving said drive shaft.

By the operation of said first drive means, the lower end of said drive shaft, having passed through and below said through hole in said rotary wheel, pressingly drives said driven shaft, and opposing the urging force of said return spring operates to separate said neck cavity mold from said injection core mold.

As a construction for mold opening of said split pair of molds constituting said neck cavity mold may be provided:

- said two split plates may have wedge-shaped notch portions at opposing ends; and
- a vertically moving plate may be provided which moves vertically together with said drive shaft in response to operation of said first drive means.

Said split mold opening means may further comprise:

- a second drive means mounted on said vertically moving plate; and
- a cam plate driven downward by said second drive member, and having a wedge-shaped end portion which engages with said notch portions formed in said two split plates.

In this way, after the vertically moving plate is driven downward to separate the injection core mold, the cam plate is driven downward by said second drive member, and the lowering stroke of the cam plate can be reduced.

It is preferable that the injection core mold, or said rotary wheel on which said injection core mold and the injection cavity mold are supported is driven in a reciprocating rotary motion, reversing the direction of rotary transfer for each operation. This simplifies the circulation of cooling medium to the cooling portions of each of the molds.

DETAILED DESCRIPTION OF THE PREFERRED EMBODIMENT

The method and apparatus of the present invention are now described in terms of a preferred embodiment, with reference to FIGS. 1 to 9.

Figure 1:
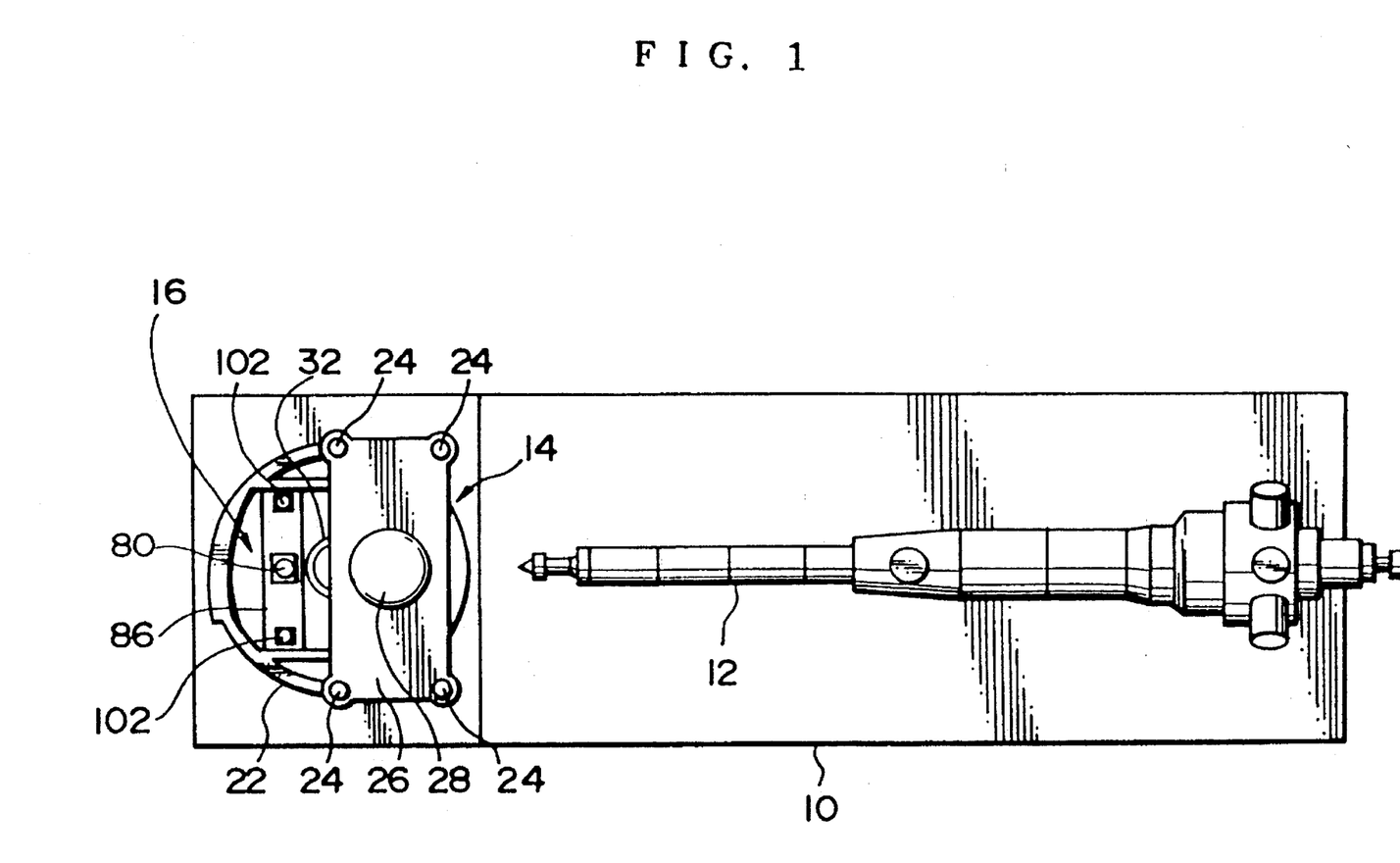
FIG. 1 is a schematic plan view showing one embodiment of the apparatus according to the present invention.

FIG. 1 is a schematic plan view of the embodiment, and in this figure, an injection unit 12 is disposed on a base 10, and in a position opposing the injection unit 12 are provided adjacently an injection molding station 14 and a cooling and ejection station 16.

Figure 4A:
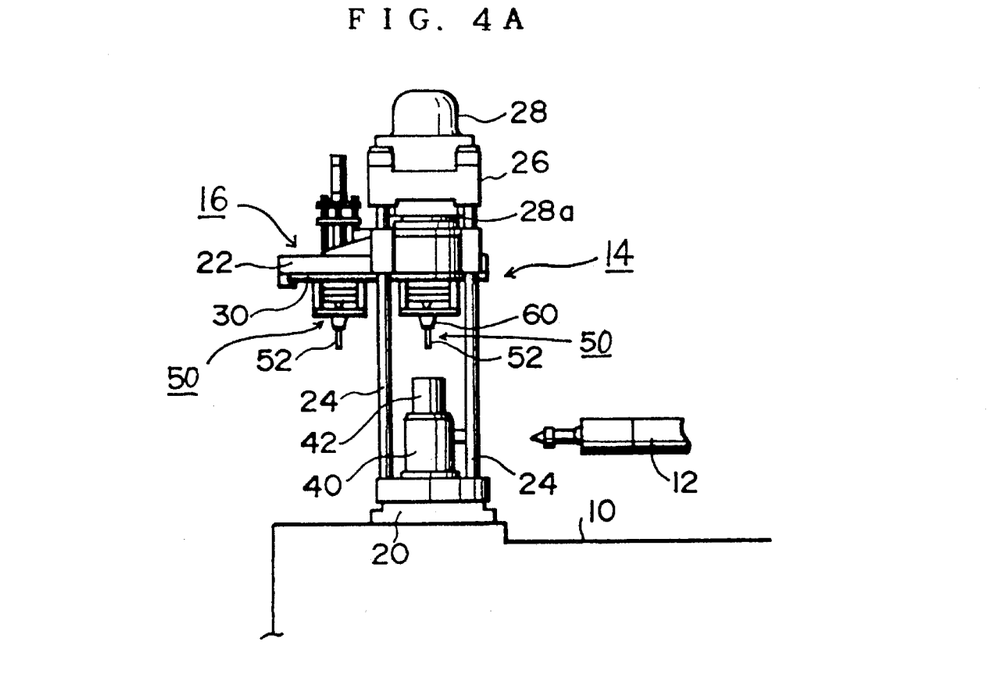
FIG. 4A is a side elevation, showing the embodiment with the mold open.
Figure 4B:
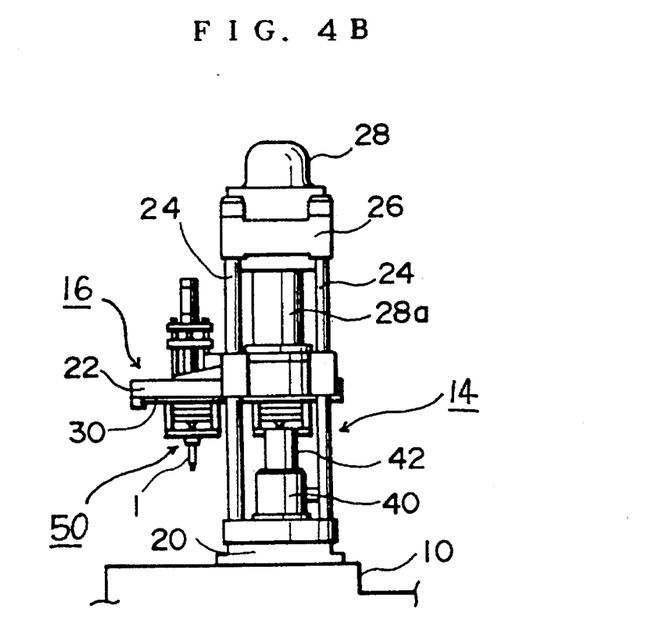
FIG. 4B is a side elevation, showing the embodiment with the mold clamped.

Below the injection molding station 14 is provided, as shown in FIGS. 4A and 4B a lower mold clamping plate 20 fixed on the base 10. Above this lower mold clamping plate 20, and spanning the positions of the injection molding station 14 and cooling and ejection station 16 is disposed an upper mold clamping plate 22 which is for example circular. This upper mold clamping plate 22 can go up and down along four tie bars 24 provided around the periphery of the injection molding station 14. As shown in FIGS. 1, 4A and 4B, a fixing plate 26 is provided at the upper ends of the tie bars 24, and this fixing plate 26 has a clamping cylinder 28 fixed thereto. The clamping cylinder 28 drives a clamping rod 28a, and this clamping rod 28a drives the upper mold clamping plate 22 vertically.

Figure 2:
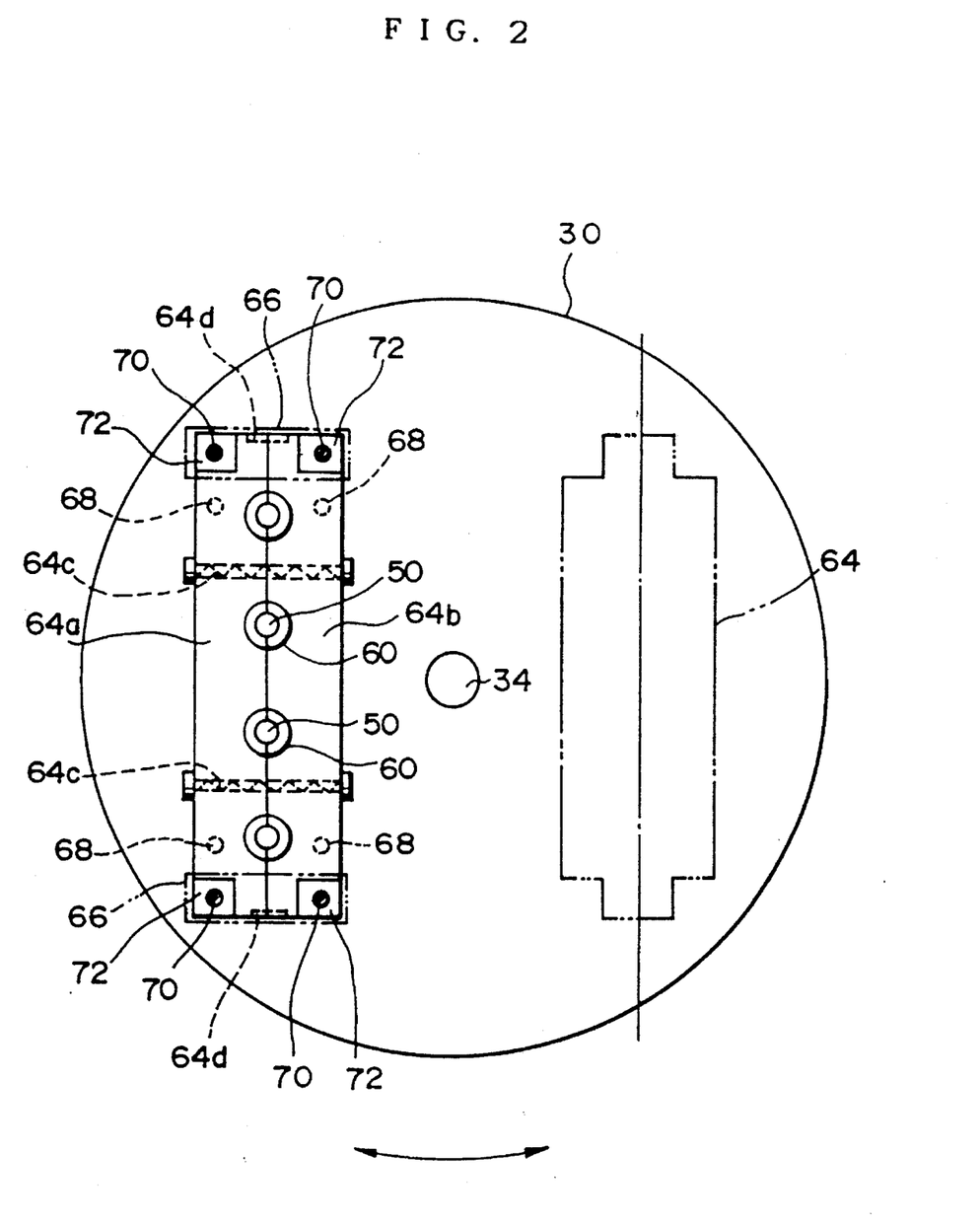
FIG. 2 is a bottom view of a rotary wheel.
Figure 5:
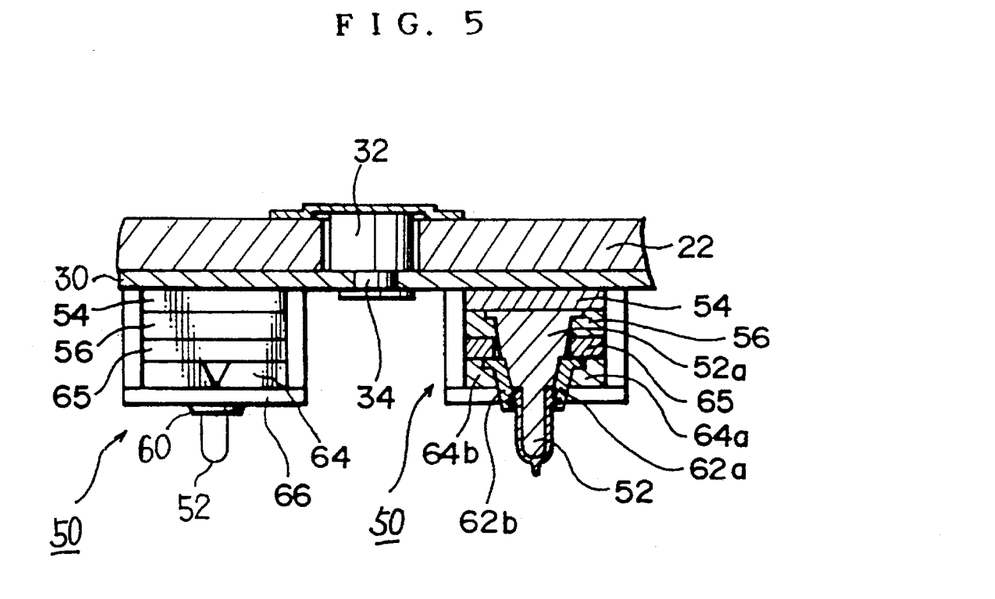
FIG. 5 is a schematic sectional view showing the construction of the injection core mold and neck cavity mold fitted on the rotary wheel.

As shown in FIGS. 4A and 4B, on the lower surface of the upper mold clamping plate 22 is supported rotatably a rotary wheel 30. This rotary wheel 30, as shown in FIG. 5, is fixed to a rotary shaft 34, which is driven rotatably by a rotary actuator 32 fixed to the upper mold clamping plate 22. As shown in FIG. 2, which is a bottom view of the rotary wheel 30, on the rotary wheel 30 are supported two sets of injection core molds 50 and neck cavity molds 60 in positions corresponding to the stations 14 and 16. The injection core molds 50 and neck cavity molds 60 are described in detail below.

As shown in FIGS. 4A and 4B, the injection molding station 14 is provided with a hot-runner mold 40 which is brought into nozzle contact with the injection unit 12, and an injection cavity mold 42 is fixed to the upper part of this hot-runner mold 40. This injection cavity mold 42 has by way of example four cavities for simultaneous injection molding at the injection molding station 14. The injection cavity mold 42 can cool injection-molded preforms by circulating a cooling medium, such as water for a room temperature, within the cavity mold.

As shown in FIGS. 4A, 4B, 5 and 6, the two sets of injection core molds 50 supported by the rotary wheel 30 each have four core pins 52, for example, for simultaneous injection molding. As shown in FIG. 5, the base portion 52a of each core pin 52 is supported by a core retainer 54 fixed to the underside of the rotary wheel 30 and a core fixing plate 56 fixed to the underside of the core retainer 54. When the clamping cylinder 28 is operated so that the clamping rod 28a drives the upper mold clamping plate 22 downward, the core pins 52 of the injection core molds 50 are driven downward integrally with the rotary wheel 30 supported by this upper mold clamping plate 22, the core retainers 54 and the core fixing plates 56, and thus mold clamping is performed with respect to the injection cavity mold 42.

Figure 9:
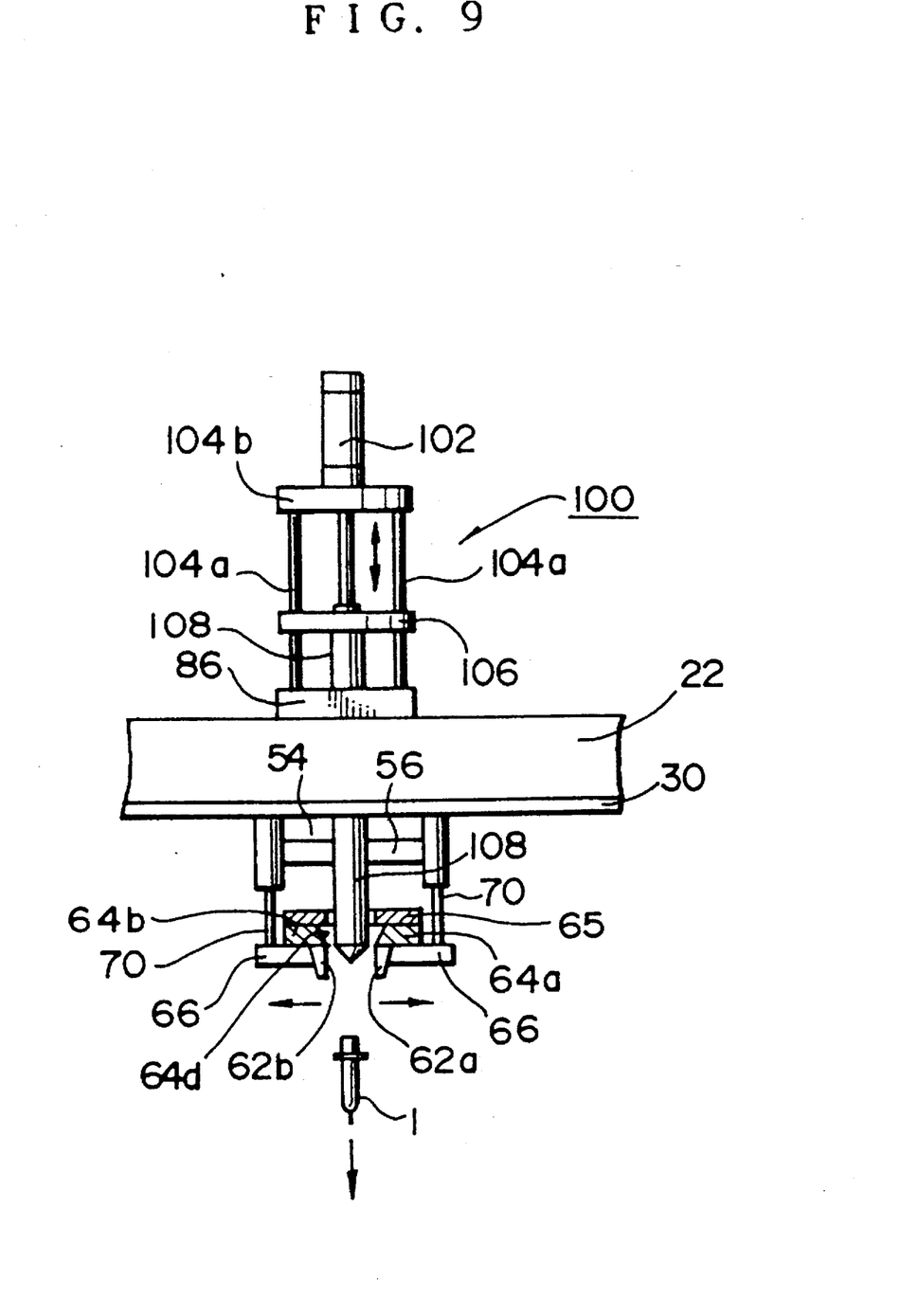
FIG. 9 is a schematic diagram illustrating the ejection of a preform.

Each of the two sets of neck cavity molds 60 supported by the rotary wheel 30, as shown in FIGS. 5 and 9, is constituted of a pair of split molds 62a and 62b, and each set of these split molds 62a and 62b is provided in a number appropriate for simultaneous injection molding. In each set, a pair of split molds 62a and 62b is provided with respective split plates 64a and 64b for fixing, and these split plates 64a and 64b constitute a neck fixing plate 64. Again, as shown in FIGS. 3 to 9, above the split plates 64a and 64b is provided a neck retainer 65 which presses down the neck fixing plate 64. Further, guide plates 66 are also provided to support the underside of the end portions of the neck fixing plate 64. The split plates 64a and 64b are maintained in the normally closed state by means of springs 64c shown in FIG. 2. Furthermore, the split plates 64a and 64b are provided with respective wedge-shaped apertures 64d, shown in FIG. 2, at their end portions. After the neck fixing plate 64 is transferred to the cooling and ejection station 16, split mold opening cams 108 described below are driven in the direction of the wedge-shaped apertures 64d drive the split plates 64a and 64b along the guide plates 66.

Figure 3:
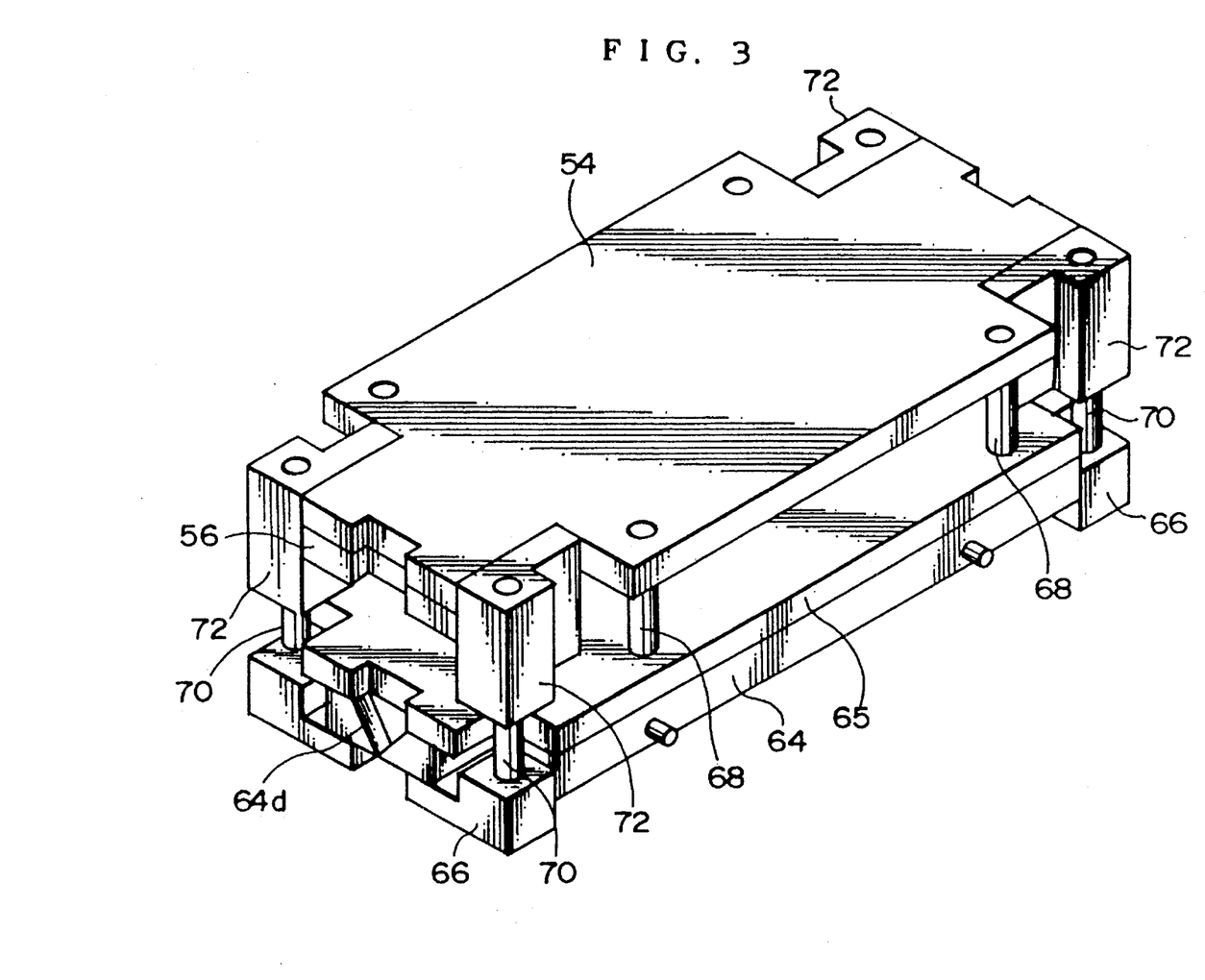
FIG. 3 is a schematic perspective view showing a neck pressure plate driven downward.
Figure 6:
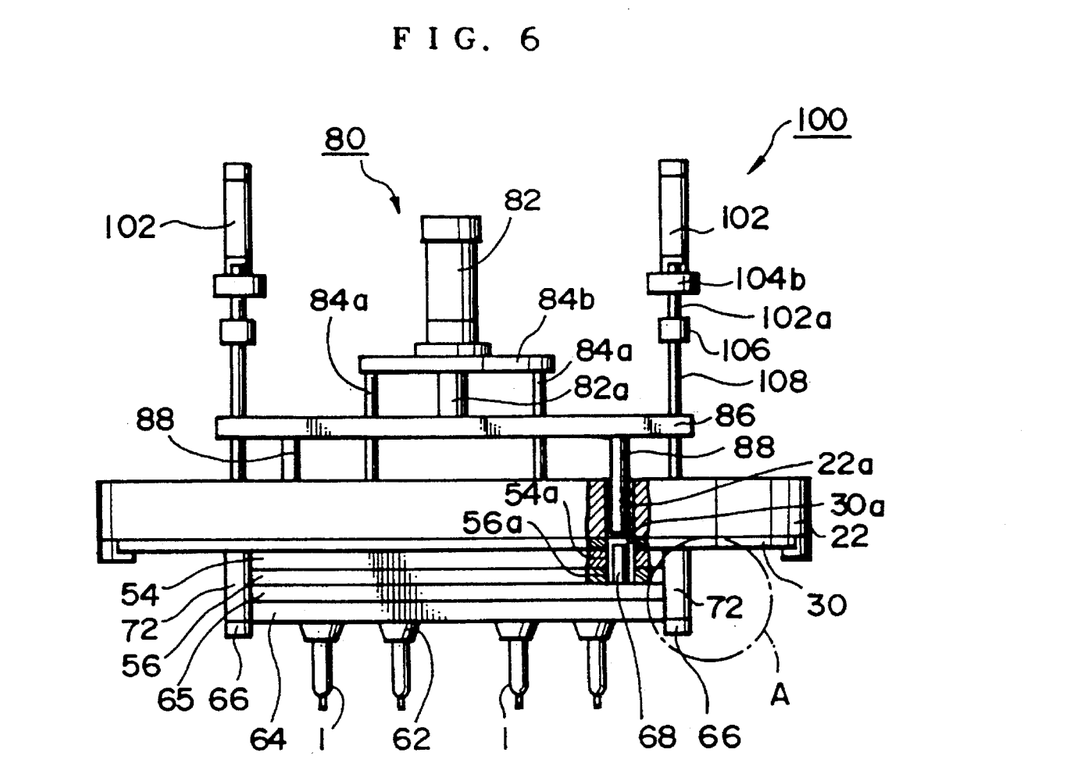
FIG. 6 is a schematic diagram showing the mechanism for ejecting the preform.
Figure 7:
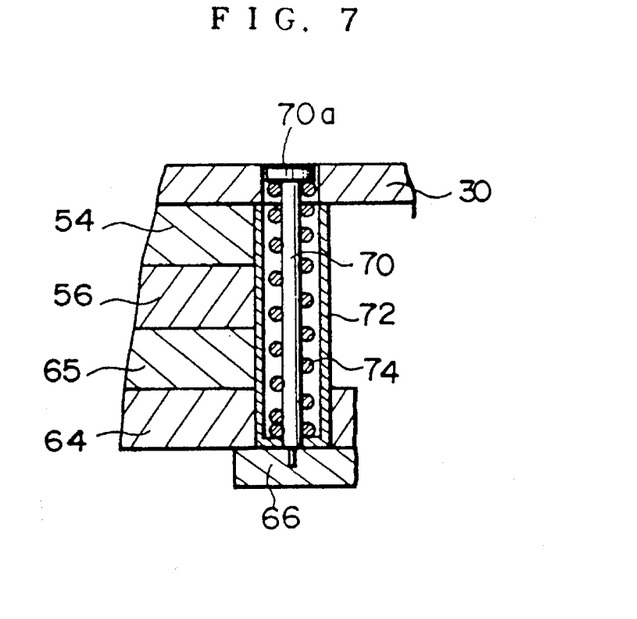
FIG. 7 is an enlarged sectional diagram of section A of FIG. 6.

As shown in FIG. 7, which is an enlarged sectional diagram of section A of FIG. 6, and FIG. 3, vertical pins 70 extend upward from the guide plates 66, with their lower ends fixed thereto, and at the upper ends of these vertical pins 70 are formed flanges 70a. Additionally, guide tubes 72 are fixed to the core retainer 54 extending downward, and the vertical pins 70 are disposed within these guide tubes 72. A return spring 74 is disposed between the bottom inner end of each guide tube 72 and the flange 70a of the corresponding vertical pin 70. The upward force of these return springs 74 constantly urge the guide plates 66 upward, and as a result the neck retainer 65 is always held in contact with the core fixing plate 56.

By maintaining the contact between the core fixing plate 56 and the neck retainer 65, the mold clamping of the injection core molds 50 and neck cavity molds 60 is obtained. By means of the external force (described below) applied in the cooling and ejection station 16 the urging force of the return springs 74 is countered, and the vertical pins 70 lowered; thus the neck retainer 65 is driven downward and away from the core fixing plate 56, and the neck fixing plate 64 is pressed down. As a result, the core pin 52 of the injection core mold 50 is separated from the preform 1 whose neck portion 2 is held by the neck cavity mold 60.

Next, the mechanism for the ejection of the preform from the cooling and ejection station 16 is described. In this embodiment, the preform ejection mechanism comprises a neck mold opening section 80 and a split mold opening section 100. The neck mold opening section 80, as shown in FIG. 6, has a first cylinder 82, and this first cylinder 82 is fixed to a first cylinder fixing plate 84b supported from the upper mold clamping plate 22 by first pillars 84a. The first cylinder 82 drives a first vertically moving plate 86 up and down by means of a first piston rod 82a. At both ends of this first vertically moving plate 86 are provided respective pressure drive rods 88. The upper mold clamping plate 22 has provided therein through-holes 22a penetrating from the upper surface to the lower surface, and the pressure drive rods 88 are disposed within these through-holes 22a. In order that the initial position of the first vertically moving plate 86 does not obstruct the rotation of the rotary wheel 30, the pressure drive rods 88 are such that their ends do not project from the lower surface of the upper mold clamping plate 22.

As shown in FIG. 6, the rotary wheel 30, core retainer 54, and core fixing plate 56 have respective holes 30a, 54a, and 56a formed in positions corresponding to the through-holes 22a in the upper mold clamping plate 22. Driven rods 68 are positioned within the holes 30a, 54a, and 56a and fixed to the upper surface of the neck retainer 65.

Figure 8:
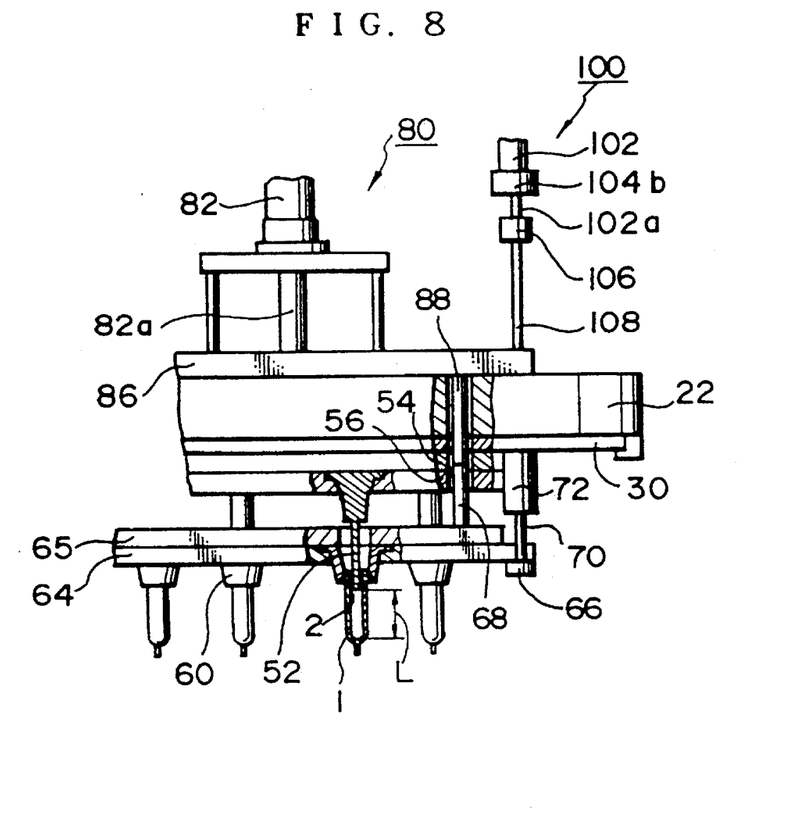
FIG. 8 is a schematic diagram illustrating the open state of the injection core mold.

When, therefore, the first cylinder 82 is driven, through the first piston rod 82a, the pressure drive rods 88, and the driven rods 68, the neck retainer 65 and neck fixing plate 64 are driven downward against the urging force of the return springs 74. As shown in FIG. 8, by this means each core pin 52 of the injection core molds 50 is separated from the preform 1 of which the neck portion 2 is held by the neck cavity mold 60. In this embodiment, it is not necessary for the core pin 52 of the injection core mold 50 to be completely detached from the opening of the preform 1, and it is sufficient if a gap opens between the core pin 52 and the preform 1 into which air enters. In this embodiment, the stroke by the neck fixing plate 64, that is, the stroke by the core pins 52 (the distance L in FIG. 8) for mold-opening is set to be, for example, 50 mm.

Next the split mold opening section 100 is described. As shown in FIGS. 1 and 6, this split mold opening section 100 has for example two second cylinders 102. As shown in FIG. 9, each of these second cylinders 102 is fixed to a second cylinder fixing plate 104b supported from the first vertically moving plate 86 by second pillars 104a. As a result, when the first vertically moving plate 86 is driven vertically by the first cylinder 82, the second cylinders 102 are also driven vertically. The second cylinders 102 drive second vertically moving plates 106 up and down by means of second piston rods 102a. At both ends of these second vertically moving plates 106 are fixed split mold opening cams 108. The lower extremities of the split mold opening cams 108 are wedge-shaped, corresponding to the wedge-shaped apertures 64d provided in the split plates 64a and 64b making up the neck fixing plate 64. As a result, when the second cylinders 102 are driven, the split mold opening cams 108 are driven down, the wedge-shaped lower extremities are inserted into the wedge-shaped apertures 64d in the neck fixing plate 64, and thereby the split plates 64a and 64b are driven apart. Additionally, the respective split molds 62a and 62b fixed to the split plates 64a and 64b are driven apart, and the preform 1 is ejected from the neck cavity mold 60. In this preferred embodiment the drive timing of the second cylinders 102 is set to be after the first cylinder 82 is driven.

Next, the operation of injection molding the preforms 1 in the embodiment above is described.
(1) Injection molding step in the injection molding station 14.

The clamping cylinder 28 is driven and the upper mold clamping plate 22 is thereby driven down, whereby the injection core molds 50 and the neck cavity molds 60 are clamped to the injection cavity mold 42. After the clamped state shown in FIG. 4 is reached, by a screw inside the injection unit 12 being advanced and rotated, the preform 1 injection molding material, for example polyethylene terephthalate (PET), is injected by way of the hot runner mold 40 into the cavity defined by the molds 42, 50 and 60, and the preforms 1 are thereby injection molded.
(2) Cooling step in the injection molding station 14

The injection cavity mold 42, the injection core molds 50 and the neck cavity molds 60 each have a cooling medium, for example water at room temperature, circulating through them, and the resin injected into the cavity defined by the molds can be immediately cooled.
(3) Step for releasing preforms from the injection cavity mold 42 in the injection molding station 14.

By the clamping cylinder 28 being so driven that it lifts the upper mold clamping plate 22, the injection core molds 50 and the neck cavity molds 60 can be lifted up away from the injection cavity mold 42, resulting in the open state shown in FIG. 4A. At this time, because an undercut with respect to the mold-opening direction is formed in each of the neck portion 2 of the preforms 1, the injection-molded preforms 1 are held by the injection core molds 50 and neck cavity molds 60 and are separated from the injection cavity mold 42.

The timing at which this mold-opening starts in the injection molding station 14 can be made considerably earlier than a conventional mold-opening start timing. In other words, the cooling time of the preforms 1 in the injection molding station 14 can be shortened. This is because even after the preforms 1 have been released from the injection cavity mold 42 the core pins 52 of the injection core molds 50 remain inside the preforms 1 and deformation of the preforms 1 accompanying their thermal shrinkage can be prevented. Therefore, the release temperature for the preforms 1 in the injection molding station 14 only has to be low enough for a skin layer thick enough for the shape of the preforms 1 to be maintained after they are separated from the injection cavity mold 42 to form at the outer surfaces of the preforms 1, and can be higher than conventional release temperatures. Even if the release temperature is high in this way, because the cooling causes the preforms 1 to shrink around the core pins 52 of the injection core molds 50, release from the injection cavity mold 42 can be carried out relatively smoothly, and release problems of the preforms 1 do not occur. Also, because in the injection molding station 14 withdrawal of the core pins 52 is not carried out, even if the preforms 1 are released at a high release temperature, the problem of the lower ends of the preforms 1 being pulled up with the core pins 52 does not occur.

The clamped state of the injection core molds 50 and the neck cavity molds 60 with respect to the preforms 1 separated from the injection cavity mold 42 is maintained by the core fixing plate 56 and the neck retainer 65 being kept in contact with each other by the return springs 74. This clamped state of the injection core molds 50 and the neck cavity molds 60 is maintained through the subsequent step of transferring the preforms 1 until in the cooling and ejection station 16 the preforms 1 are released from the injection core molds 50. Cooling of the preforms 1 is possible throughout the time during which this clamped state of the injection core molds 50 and the neck cavity molds 60 is maintained.
(4) Preform 1 transfer step The preforms 1 are carried from the injection molding station 14 to the cooling and ejection station 16 by the rotary actuator 32 being driven and the rotary wheel 30 being rotated thereby through 180 degrees. During this preform 1 transfer step, it is possible for cooling of the preforms 1 by the cooling medium circulating through the injection core molds 50 and the neck cavity molds 60 to continue without interruption.

Generally, when the preforms 1 are released from the mold at a high temperature, crystallization occurs due to inadequate cooling and the wall surfaces of the preforms 1 become non-transparent, and particularly when PET is being used to make transparent containers this is a fatal defect. According to experiments carried out by the present inventors, this crystallization and loss of transparency of the preforms 1 accompanying inadequate cooling is particularly marked on the inner surface of the walls of the preforms 1. This is because on the inner surface of the walls of the preforms 1 there is less surface area in contact with the mold and consequently the inner surface is more liable to be inadequately cooled than the outer surface. Also, when as conventionally the injection cavity mold 42 and the injection core molds 50 are separated from the preforms 1 in the injection molding station, the inner surface of the walls is more liable to be inadequately cooled than the outer surface because the heat-radiating surface area on the inner surface of the preforms 1 is less than of the outer surface and furthermore heat accumulates in the interior of the preforms 1.

In this embodiment, even if in the injection molding station 14 the preforms 1 are released from the mold at a relatively high temperature, in the subsequent transfer step it is possible for the preforms 1 to continue to be cooled by the injection core molds 50 and the neck cavity molds 60. In particular, because the inner surface of the walls of the preforms 1 can be uninterruptedly cooled by the core pins 52 of the injection core molds 50, crystallization and loss of transparency caused by inadequate cooling can be certainly prevented. In particular, the neck portions 2, which because they are thick have large heat capacities and are more liable to crystallize than other portions, can be cooled by the neck cavity molds 60 and prevented from crystallizing.

(5) Preform cooling step in the cooling and ejection station 16.

Even after the preforms 1 have been transferred to the cooling and ejection station 16, by the clamped state of the injection core molds 50 and the neck cavity molds 60 with respect to the preforms 1 being maintained, the preforms 1 can be cooled as they were during the above-mentioned transfer step. At this time, even if in the injection molding station 14 the clamping cylinder 28 has been driven and the upper mold clamping plate 22 lowered for the injection molding of the next preforms, because the above-mentioned clamped state in the cooling and ejection station 16 is maintained, cooling of the preforms 1 can be continued.

(6) Step for separating the neck cavity molds 60 from the injection core molds 50

Cooling of the preforms 1 by the core pins 52 of the injection core molds 50 only has to continue long enough for crystallization caused by inadequate cooling of the inner surface of the walls of the preforms 1 to be prevented and for deformation of the ejected preforms 1 to be avoided, and indeed if the preforms 1 are excessively cooled by the core pins 52, removal of the core pins 52 becomes difficult. Therefore, in this cooling and ejection station 16, first the preforms 1 are released from the injection core molds 50. In this embodiment, this is achieved by the neck cavity molds 60 holding the preforms 1 being separated from the injection core molds 50.

This separation of the neck cavity molds 60 is carried out by the neck retainer 65 kept in contact with the core fixing plate 56 by the urging force of the return springs 74 being lowered by the neck mold opening section 80. When the first cylinder 82 of the neck mold opening section 80 is driven, the pushing force thereof transmitted through the first piston rod 82a, the first vertically moving plate 86, the pressure drive rods 88 and the driven rods 68 causes the neck fixing plate 64 to be pressed against the neck retainer 65 and be driven downward as shown in FIGS. 3 and 8. At this time, because the preforms 1 have their neck portions 2 held by the neck cavity molds 60, the preforms 1 are also driven downward together with the neck fixing plate 64 and the neck cavity molds 60. Consequently, the relative separation of the neck cavity molds 60 from the injection core molds 50 results in the injection core molds 50 being separated from the preforms 1.

This stroke through which the injection core molds 50 move with respect to the preforms 1 does not have to be so long that the core pins 52 are pulled completely clear of the open ends of the preforms 1 for the subsequent transfer of the preforms 1 as it does conventionally, and need only be long enough for at least gaps through which air can enter to be formed between the inner surface of the walls of the preforms 1 and the core pins 52. Consequently, the mold-opening stroke of the injection core molds 50 depends on the angle of the taper provided on the core pins 52 and the inner surface of the walls of the preforms 1, and the greater this taper angle is, the shorter the mold-opening stroke needs to be. Because the mold-opening stroke of the injection core molds 50 can be shortened in this way, the installation height of the first cylinder 82 can be made low and the overall height of the injection molding apparatus can be made low, and this is advantageous in the transportation and installation of the apparatus.

(7) Preform ejection step

Because the preforms 1 have their neck portions 2 held by the neck cavity molds 60 comprising the pairs of split molds 62a and 62b, the preforms 1 can be ejected by these neck cavity molds 60 being opened. To bring this about, the second cylinders 102 of the split mold opening section 100 are driven. This driving force of the second cylinders 102 is transmitted to the split mold opening cams 108 by way of the second piston rods 102a and the second vertically moving plates 106. By the split mold opening cams 108 being driven downward, as shown in FIG. 9 their ends are inserted into the wedge-shaped apertures 64d formed in the split plates 64a and 64b, these split plates 64a and 64b are driven open, and the pairs of split molds 62a and 62b are thereby opened. At this time, even if the neck portion 2 of a preform 1 has stuck to one of the split molds 62a and 62b and tries to move therewith, because the respective core pin 52 of the injection core molds 50 is still inside the preform 1, lateral movement of the preform 1 is restricted and the preform 1 can be dropped downward without fail.

In the state before the split mold opening cams 108 are driven downward, in order to avoid the split plate opening cams 108 interfering with the rotation of the rotary wheel 30 it is necessary that their ends stop within the thickness of the upper mold clamping plate 22. On the other hand, because the neck fixing plate 64 which is driven open by these split mold opening cams 108 is in the position most remote from the rotary wheel 30, the downward stroke of the split mold opening cams 108 is long. In this embodiment, because the second cylinders 102 which drive these split mold opening cams 108 are mounted on the first vertically moving plate 86 driven by the first cylinder 82 and because before the split mold opening cams 108 are driven the first vertically moving plate 86 is driven, the actual downward stroke through which the split mold opening cams 108 are driven by the second cylinders 102 is reduced. As a result, the installation height of the second cylinders 102 can be made low, the overall height of the injection molding apparatus can be made low, and an apparatus advantageous from the points of view of transportation and installation can be provided.

After this preform 1 ejection step is completed, the first and second cylinders 82 and 102 return to their original states. As a result, the neck retainer 65 is brought back into contact with the core fixing plate 56 by the return springs 74, and the injection core molds 50 and the neck cavity molds 60 are returned to their clamped state in preparation for the next injection molding.

The cooling and mold-opening steps described above carried out in the cooling and ejection station 16 only have to be finished within the time taken for the injection molding of the next, new preforms in the injection molding station 14 to finish, in other words within the injection molding cycle time. The preform 1 cooling time depends particularly on the thickness of the main body portions of the preforms 1, and the thicker the preforms 1 are the longer the cooling time that must be provided. In this embodiment this cooling time can be adjusted by setting the timing of the mold-opening of the injection core molds 50 in the cooling and ejection station 16 as well as by adjusting the cooling time in the injection molding station 14. As a result, even while the mold-release temperature in the injection molding station 14 is made high and the injection molding cycle time thereby shortened, because adjustment of the cooling time is easy, a highly flexible preform injection molding station can be provided.

After the preform 1 injection molding in the injection molding station 14 is completed, the injection core molds 50 and the neck cavity molds 60 in the two stations 14 and 16 are interchanged by the rotary wheel 30 being rotated through 180 degrees by the rotary actuator 32. In this embodiment, the rotary actuator 32 comprises a reversible rotary carrying means with a reciprocating direction of rotation for each transfer. As a result, even if the injection core molds 50 and the neck cavity molds 60 rotationally transferred have cooling pipes for circulating cooling medium therethrough connected thereto, these cooling pipes will not be twisted through more than one revolution. Consequently, it is possible to connect these cooling pipes to the molds without using rotary connectors and their construction does not become complicated.

(8) Blow-molding step

By connection of the preform injection molding apparatus to a blow-molding apparatus, the preforms 1 can be used, while still retaining the heat of injection molding, for blow-molding of bottles or other hollow objects by the so-called hot parison method.

In this case, the preforms 1 ejected from the cooling and ejection station 16 are taken by a support means which holds the neck and transferred to a blow-molding station. In the course of transfer to the blow-molding station, the temperature of the preforms 1 may be adjusted for desired thickness distribution.

In the blow-molding station, the preforms 1 are blow-molded into bottles by a means well known in the art. That is to say, each preform 1 is disposed within a blow cavity mold, and is stretched biaxially by a stretching rod and air blown from a blow core mold.

Because for the reasons discussed above the preforms 1 are given a uniform temperature or a suitable temperature distribution, it is possible to mold bottles of a desired thickness. Also, because whitening crystallization of the bottles is prevented, highly transparent bottles can be molded. The present invention is not limited to being applied to the hot parison blow molding method described above, and of course can also be applied to so-called cold parison blow molding wherein the preforms are returned to room temperature before being heated again and blow molded. In this case also, there is the effect that the injection molding cycle time can be shortened.

The present invention is not limited to the above-described embodiment, and various modification can be made within the scope of the invention.

In the embodiment described above, the injection core molds 50 and neck cavity molds 60 are transferred by the rotary wheel 30, but for example in the case that the shape of the neck portion 2 does not form an undercut with respect to the mold-opening direction, the neck cavity molds 60 are not necessarily used. In this case, after separating the injection cavity mold 42 in the injection molding station 14, the preforms 1 can be transferred to the cooling and ejection station 16 by the injection core molds 50 alone. Since the preforms 1 shrink on cooling to adhere closely to the core pins 52 of the injection core molds 50, the release from the injection cavity mold 42 can be carried out smoothly, and even without an undercut in the neck portion 2, the preforms 1 can be transferred by the injection core molds 50.

In the cooling and ejection station 16, to release the preforms 1 from the injection core molds 50, the following method may for example be used. The core pins 52 of the injection core molds 50 are provided with a function to supply compressed air into the preforms 1 for the purposes of ejection. In this case, in the cooling and ejection station 16, after the preforms 1 have been cooled by the injection core molds 50, compressed air is supplied from the core pins 52, and this air pressure causes the preforms 1 to fall downward.

We claim:

1. A method of injection molding a preform, comprising:

a step in an injection molding station of injection molding a preform in clamped molds including an injection cavity mold and injection core mold each of which has a cooling portion;

a step in said injection molding station of releasing said preform from said injection cavity mold;

a step of transferring said preform while being cooled by said injection core mold to a cooling and ejection station; and a step in said cooling and ejection station of cooling said preform by said injection core mold and thereafter ejecting said preform from said injection core mold during an injection molding cycle for a next preform in said injection molding station, wherein in said injection molding step, said preform, which has a neck portion having an undercut with respect to a direction of mold-opening, is injection molded using a neck cavity mold defining the outer surface of said neck portion, and said neck cavity mold comprises a split pair of molds having cooling portions;

in said transfer step and said cooling step in said cooling and ejection station, said preform is cooled with said injection core mold and said neck cavity mold maintained in the clamped state; and in said ejection step in said cooling and ejection station, said injection core mold is separated from said neck cavity mold by relative mold-opening driving through only a stroke sufficient to allow a space to open between said injection core mold and the inner surface of said preform held by said neck cavity mold, and thereafter said split pair of molds of said neck cavity mold is driven to be separated, and said preform is ejected.

2. The method of injection molding a preform of claim 1, wherein:

in said preform ejection step, said injection core mold remaining in said preform prevents said preform from adhering to either of said split pair of molds and moving therewith in the direction of driving said pair of split molds to be separated.

3. The method of injection molding a preform of claim 1 wherein:

the cooling time of said preform is adjusted by adjusting the timing of said relative mold-opening driving in said cooling and ejection station.

4. The method of injection molding a preform of claim 1 wherein:

said injection core mold and said neck cavity mold together are reversibly rotated between said injection station and said cooling and ejection station, which being separated by substantially 180 degrees, and said injection core mold and said neck cavity mold are transferred so as to be interchanged between said stations.

5. The method of injection molding a preform of claim 1 wherein:

in said transfer step, said neck cavity mold is held in contact with said injection core mold by a return spring, maintaining the clamped state of both said molds;

in said cooling and ejection station, said neck cavity mold holding said preform is pulled away from said injection core mold by an external force opposing the urging force of said return spring, so that said injection core mold is separated from said preform.

6. The method of injection molding a preform of claim 1 wherein:

the step of separating said injection cavity mold is carried out after the formation of a skin layer on the outer surface of said preform cooled by said injection cavity mold sufficient to maintain the shape of said preform after separation from said injection cavity mold.

7. The method of injection molding a preform of claim 1, wherein:

in said cooling and ejection station, said preform is ejected by blowing air from said injection core mold within said preform.

8. A method of injection blow molding comprising:

a step in an injection molding station of injection molding a preform in clamped molds including an injection cavity mold and injection core mold each of which has a cooling portion;

a step in said injection molding station of releasing said preform from said injection cavity mold;

a step of transferring said preform while being cooled by said injection core mold to a cooling and ejection station;

a step in said cooling and ejection station of cooling said preform by said injection core mold and thereafter ejecting said preform from said injection core mold during an injection molding cycle for a next preform in said injection molding station, wherein in said injection molding step, said preform, which has a neck portion having an undercut with respect to a direction of mold-opening, is injection molded using a neck cavity mold defining the outer surface of said neck portion, and said neck cavity mold comprises a split pair of molds having cooling portions;

in said transfer step and said cooling step in said cooling and ejection station, said preform is cooled with said injection core mold and said neck cavity mold maintained in the clamped state;

in said ejection step in said cooling and ejection station, said injection core mold is separated from said neck cavity mold by relative mold-opening driving through only a stroke sufficient to allow a space to open between said injection core mold and the inner surface of said preform held by said neck cavity mold, and thereafter said split pair of molds of said neck cavity mold is driven to be separated, and said preform is ejected;

a step of transferring said preform to a blow-molding station while the heat of injection molding is retained; and a step of blow-molding a hollow body from said preform, by disposing said preform in a blow cavity mold, applying longitudinal stretching by means of a stretching rod, and introducing air from a blow core mold in said blow-molding station.

9. Injection molding apparatus for a preform having an injection molding station for injection molding the preform, and a cooling and ejection station for releasing and ejecting said preform after cooling, said injection molding apparatus comprising:

injection core molds disposed at positions corresponding to both of said stations, each of the injection core molds having a cooling portion for cooling said preform;

an interchange transfer means for interchanging said injection core molds between said both stations;

an injection cavity mold adapted to be clamped with said injection core mold disposed in said injection molding station, and having a cooling portion for cooling said preform;

a mold clamping means operating to clamp said injection core mold and injection cavity mold in said injection molding station, and also operating to separate relatively said injection cavity mold from said preform;

an ejection means, operating to eject said preform from said injection core mold after said preform disposed in said cooling and ejection station has been cooled by said injection core mold; and a neck cavity mold adapted to be clamped and opened relatively with said injection core molds and supported by said interchange transfer means; wherein said neck cavity mold comprise a split pair of molds defining the outer surface of a neck portion of said preform and said split pair of molds each having cooling portions;

said interchange transfer means transfers said preform having been injection molded to said cooling and ejection station while said preform is being cooled by said neck cavity mold and said injection core mold; and said ejection means comprises:

a mold opening means which operates to separate said neck cavity mold relative to said injection core mold through only a stroke sufficient to allow a space to open between said injection core mold and an inner surface of said preform held by said neck cavity mold; and a split mold opening means which after said neck cavity mold has been subject to said relative mold-opening operates to separate said split pair of molds and eject said preform.

10. The injection molding apparatus for a preform of claim 9, wherein:

said interchange transfer means is a rotary wheel executing intermittent rotary transfer of said injection core mold between said injection molding station and cooling and ejection station, which being disposed at rotary positions separated by substantially 180 degrees.

11. The injection molding apparatus for a preform of claim 9, further comprising:

a return spring which urges said neck cavity mold against said injection core mold and maintains both molds in the clamped state; and wherein said mold opening means opposes the urging force of said return spring and operates to separate said neck cavity mold relative to said injection core mold.

12. The injection molding apparatus for a preform of claim 11, further comprising:

two split plates supporting respective of said split pair of molds constituting said neck cavity mold;

a guide member guidably supporting said two split plates so as to be selectively contacted or separated, and to which said return spring is attached;

a pressure plate disposed above said two split plates; and a driven shaft erected in the upward direction above said pressure plate and of such a length that an upper end of the driven shaft does not reach said rotary wheel;

and wherein said mold opening means comprises:
a through hole provided in said rotary wheel in a position corresponding to said driven shaft;
a drive shaft having a lower end above said through hole; and
a first drive means pressingly driving said drive shaft;

and by the operation of said first drive means, the lower end of said drive shaft, having passed through and below said through hole in said rotary wheel, pressingly drives said driven shaft, and opposing the urging force of said return spring operates to separate said neck cavity mold from said injection core mold.

13. The injection molding apparatus for a preform of claim 12, wherein:

said two split plates have wedge-shaped notch portions at opposing ends;

a vertically moving plate is provided which moves vertically together with said drive shaft in response to operation of said first drive means; and said split mold opening means comprises:
a second drive means mounted on said vertically moving plate; and
a cam plate driven downward by said second drive member, and having a wedge-shaped end portion which engages with said notch portions formed in said two split plates.

14. The injection molding apparatus for a preform claim 10 wherein:

said rotary wheel is driven in a reciprocating rotary motion, and reverses the direction of rotary transfer for each operation.

15. A molding apparatus for injection molding a preform having a neck portion and cylindrical body portion, supported by a transfer member corresponding to an injection molding station and other station so as to be transferred to each of said stations, comprising:

an injection core mold having a core pin which defines an inner surface of said preform and cools said preform;

a neck cavity mold which consists of split molds and can be clamped with said injection core mold in a mold clamping direction, said split molds defining an outer surface of said neck portion and cooling said neck portion;

a core fixing plate for holding said injection core mold;

a neck fixing plate which consists of split plates for holding said split molds of said neck cavity mold;

a guide member which slidably supports said neck fixing plate in a mold-opening direction of said neck cavity mold; and mold clamping means for clamping said neck cavity mold with said injection core mold by urging said guide member in a mold clamping direction.

16. A molding apparatus of claim 15, wherein said mold clamping means comprises a spring means which urges said guide member in the mold clamping direction.

17. A molding apparatus of claim 15, wherein said mold clamping means comprises an air cylinder which urges said guide member in the mold clamping direction.

18. A molding apparatus of claim 15, wherein said mold clamping means comprises a hydraulic cylinder which urges said guide member in the mold clamping direction.

19. A molding apparatus for injection molding a preform having a neck portion and a cylindrical body portion, provided to a transfer member corresponding to an injection molding station and other station so as to be transferred to each of said stations, comprising:

an injection core mold having a core pin which defines an inner surface of said preform and cools said preform;

a neck cavity mold which consists of split molds and can be clamped with said injection core mold in a mold clamping direction, said split molds defining an outer surface of said neck portion and cooling said neck portion;

a neck fixing plate which consists of split plates for holding said split molds of said neck cavity mold;

a first guide member which slidably supports at least a part of an underside of said neck fixing plate;

a second guide member which slidably supports at least a part of a top surface of said neck fixing plate;

an urging means for urging said first guide member in the mold clamping direction; and a mold-opening means which is pressed by an ejection means provided to an upper portion of said transfer means to separate said neck cavity mold from said injection core mold.

20. A molding apparatus of claim 19, wherein said mold-opening means which separates said neck cavity mold from said injection core mold is provided to said second guide member and comprises a driven rod extending below said transfer members.

21. A molding apparatus of claim 20, wherein said driven rod separates said neck cavity mold relative to said injection cavity mold through only a stroke sufficient to allow a space to open between said injection core mold and the inner surface of said preform held by said neck cavity mold.

22. A molding apparatus of claim 19, wherein said split plates have wedge-shaped notch portions at opposing ends.

\* \* \* \* \*